United States Patent
Mouskis et al.

(10) Patent No.: US 8,205,837 B2
(45) Date of Patent: Jun. 26, 2012

(54) DROGUE ASSEMBLY FOR IN-FLIGHT REFUELLING

(75) Inventors: Christopher Mouskis, Wimborne (GB); Ismet Gursul, Bradford-on-Avon (GB); James Kemmitt, Ferndown (GB)

(73) Assignee: Flight Refuelling Limited, Dorset (GB)

( * ) Notice: Subject to any disclaimer, the term of this patent is extended or adjusted under 35 U.S.C. 154(b) by 420 days.

(21) Appl. No.: 12/307,183

(22) PCT Filed: Jun. 27, 2007

(86) PCT No.: PCT/GB2007/002410
§ 371 (c)(1),
(2), (4) Date: Jul. 21, 2009

(87) PCT Pub. No.: WO2008/003933
PCT Pub. Date: Jan. 10, 2008

(65) Prior Publication Data
US 2010/0019090 A1    Jan. 28, 2010

(30) Foreign Application Priority Data
Jul. 5, 2006 (GB) .................................. 0613386.2

(51) Int. Cl.
*B64D 39/00* (2006.01)
(52) U.S. Cl. .................................. 244/135 A; 244/1 TD
(58) Field of Classification Search ................ 244/1 TD, 244/135 A, 135 R, 145, 10, 49, 138; 428/189; 221/232
See application file for complete search history.

(56) References Cited

U.S. PATENT DOCUMENTS

| | | | | |
|---|---|---|---|---|
| 1,841,137 A * | 1/1932 | Lichter | ........................ | 416/70 R |
| 2,823,881 A * | 2/1958 | Patterson | .................. | 244/135 A |
| 2,946,543 A * | 7/1960 | Gordon et al. | ............. | 244/135 A |
| 2,960,291 A * | 11/1960 | Patterson | ....................... | 244/113 |
| 3,749,337 A * | 7/1973 | Jalbert | ........................... | 244/145 |
| 4,316,554 A * | 2/1982 | Lloyd | ............................ | 221/232 |
| 5,131,438 A * | 7/1992 | Loucks | ............................. | 141/1 |
| 5,255,877 A * | 10/1993 | Lindgren et al. | ........... | 244/135 A |
| 5,417,385 A * | 5/1995 | Arnold et al. | .................. | 244/1 A |
| 5,427,333 A * | 6/1995 | Kirkland | .................... | 244/135 A |
| 5,463,971 A * | 11/1995 | Abernethy | ..................... | 114/311 |

(Continued)

FOREIGN PATENT DOCUMENTS
EP   0 694 471 A   1/1996

OTHER PUBLICATIONS

International Search Report for PCT/GB2007/002410 dated Sep. 14, 2007 (3 pages).

(Continued)

*Primary Examiner* — Joshua J Michener
*Assistant Examiner* — Medhat Badawi
(74) *Attorney, Agent, or Firm* — Finnegan Henderson Farabow Garrett & Dunner LLP (57) ABSTRACT

A drogue assembly includes a probe guide such as a standard small high speed drogue with a first canopy (14), and a foldable second canopy (20) mounted around the first canopy which is biased outwardly, and is foldable inwardly under air pressure loading to overlie the small drogue at low speeds. Thus the drag produced by the drogue varies automatically with airspeed allowing the assembly to be used over a wide range of airspeeds.

26 Claims, 5 Drawing Sheets

U.S. PATENT DOCUMENTS

| | | | | |
|---|---|---|---|---|
| 5,474,257 A * | 12/1995 | Fisher et al. | | 244/49 |
| 5,906,336 A * | 5/1999 | Eckstein | | 244/135 A |
| 6,145,788 A * | 11/2000 | Mouskis et al. | | 244/135 A |
| 6,375,123 B1 * | 4/2002 | Greenhalgh et al. | | 244/135 A |
| 6,464,173 B1 * | 10/2002 | Bandak | | 244/135 A |
| 6,588,465 B1 * | 7/2003 | Kirkland et al. | | 141/279 |
| 6,824,105 B2 * | 11/2004 | Edwards | | 244/135 A |
| 7,097,133 B2 * | 8/2006 | Elam | | 244/3.29 |
| 7,179,145 B2 * | 2/2007 | Driscoll et al. | | 441/7 |
| 7,513,454 B2 * | 4/2009 | Sullivan | | 244/1 TD |
| 7,578,479 B1 * | 8/2009 | Colich et al. | | 244/137.4 |
| 7,887,010 B2 * | 2/2011 | Takacs et al. | | 244/135 A |
| 2003/0136874 A1 * | 7/2003 | Gjerdrum | | 244/10 |
| 2004/0050998 A1 * | 3/2004 | Edwards | | 244/10 |
| 2005/0178896 A1 * | 8/2005 | Cylinder | | 244/72 |
| 2006/0060710 A1 * | 3/2006 | Takacs et al. | | 244/135 A |
| 2006/0065785 A1 * | 3/2006 | Enig et al. | | 244/135 A |
| 2006/0284019 A1 * | 12/2006 | Takacs et al. | | 244/135 A |
| 2007/0108339 A1 * | 5/2007 | Plotkin | | 244/1 TD |
| 2008/0027593 A1 * | 1/2008 | Saggio et al. | | 701/3 |
| 2008/0054124 A1 * | 3/2008 | Takacs et al. | | 244/135 A |
| 2008/0075930 A1 * | 3/2008 | Kornbluh et al. | | 428/189 |
| 2009/0065639 A1 * | 3/2009 | Hazan | | 244/1 TD |
| 2010/0170021 A1 * | 7/2010 | Van Es et al. | | 2/2.5 |

OTHER PUBLICATIONS

Written Opinion of the International Searching Authority for PCT/GB2007/002410 dated Sep. 14, 2007 (5 pages).

International Preliminary Report on Patentability and Written Opinion for PCT/GB2007/002410 dated Jan. 6, 2009 (7 pages).

UK Search Report for corresponding United Kingdom Application No. GB0613386.2 dated Sep. 18, 2006 (1 page).

* cited by examiner

DROGUE ASSEMBLY FOR IN-FLIGHT REFUELLING

CROSS-REFERENCE TO RELATED APPLICATIONS

This application is a national phase application of International Application No. PCT/GB2007/002410, filed Jun. 27, 2007, and claims the priority of United Kingdom Application No. 0613386.2, filed Jul. 5, 2006.

This invention relates to a drogue assembly for in-flight refueling.

Drogues are used to stabilise refueling hose trailing from a tanker aircraft in a generally horizontal attitude. They provide drag for a refueling coupling at the trailing end of the refueling hose which is to be coupled for in-flight refueling with a probe from a following aircraft which is to be refuelled. This drag resists the forward movement of the probe. However, the resistance due to drag should not be so great that the probe may be damaged by impact with the drogue in flight. Also the higher the drag, the greater the power that will be necessary to wind in the refueling hose after in-flight refueling has been completed.

It is desirable to be able to use the same in-flight refueling equipment to refuel either a low speed or high speed aircraft. For example, a helicopter may cruise at about 100 to 130 Knots Equivalent Airspeed (KEAS) whereas jet aircraft refueling speeds are commonly in excess of 180 KEAS, and may be up to 325 KEAS. This is difficult if the equipment has a drogue parachute because drag load on the parachute varies proportionally to the square of the airspeed. In addition, at high airspeed there is a requirement (ie stipulated in NATO STANNAG 3447) that receiver aircraft must have a certain geometry around the probe. This geometry only allows the use of a small drogue, which would not produce sufficient drag at low speeds.

U.S. Pat. No. 6,145,788 discloses a drogue assembly for in-flight refueling including a drogue parachute which comprises a circumferential array of triangular support arms which carry a canopy which extends circumferentially around their shorter sides at the distal ends. At least alternate ones of the support arms carry leaf springs which extend into pockets formed in the canopy. The leaf springs act on the canopy in opposition to air pressure loading on it in flight so that it tends to increase the chord angle of the canopy and thus the effective area presented to the airflow. Hence the effective area of the drogue parachute in flight is varied automatically above a certain predetermined minimum so it is reduced as air speed is increased and vice versa.

This configuration has proved suitable for drag coefficient changes approaching a factor of 2. However, for the range of speeds referred to above, changes of above a factor of 3 must be dealt with. It has been necessary therefore to use different drogues having different sizes in order to operate over this range of airspeeds.

An object of this invention is to provide a compact drogue assembly which minimises the range of drag loads established when conducting in-flight refueling over a broad range of different air speeds.

According to this invention there is provided a drogue assembly for in-flight refueling comprising a reception coupling member having an aperture for receiving a refueling probe along an axis thereof, and a drogue parachute arranged around the coupling, the parachute comprising at least one circumferential array of support arms carrying a first canopy and a second canopy arranged around the first canopy, the second canopy having a configuration which is arranged to change under air pressure loading on the canopy in flight such that the second canopy folds inwardly towards the first canopy and the effective area of the second canopy is thereby reduced.

Thus the effective area which the second canopy presents to the airstream is varied automatically so that it reduces as air speed increases, and vice versa, which facilitates providing a drag force which remains substantially stable at low speeds. Preferably, the configuration of a first of the canopies is also arranged to change, but over a range of airspeeds higher than that causing the configuration of the second canopy to change. This allows the working range of airspeeds to be maximised.

The first canopy may comprise a first drogue parachute arrangement of a known type as described above, for example a small high speed drogue. In this case, the second canopy may be mounted to the coupling member on a second array of support arrays positioned upstream of the first parachute, so as to form a second parachute arranged around the outside of the first parachute, and foldable towards it. Thus in the folded condition, the second parachute may overlie the outside surface of the first parachute, so as not to significantly increase the size or envelope of the drogue at high speeds.

Alternatively, the first and second canopies may be mounted on the same array of support arms. In this case, the first canopy may extend inwardly of the support arms in the conventional manner, and the second canopy may extend outwardly of the support arms, so as to be arranged around the first canopy.

The canopies may each comprise sheet material mounted adjacent the tips of the support arms, and extending therebetween. Each canopy is conveniently an annular strip of sheet material mounted to the support arms at circumferentially spaced intervals, for example by means of radially extending leaf springs.

The support arms may be biased outwardly by biasing means, which may for example comprise a spring attached between the base of each support arm and the coupling member. The arms may each be pivotally mounted to the coupling member at a position adjacent the base, so that the arms rock around the pivotal mounting.

The invention will now be described with reference to the accompanying drawings, in which.

Figure 1:
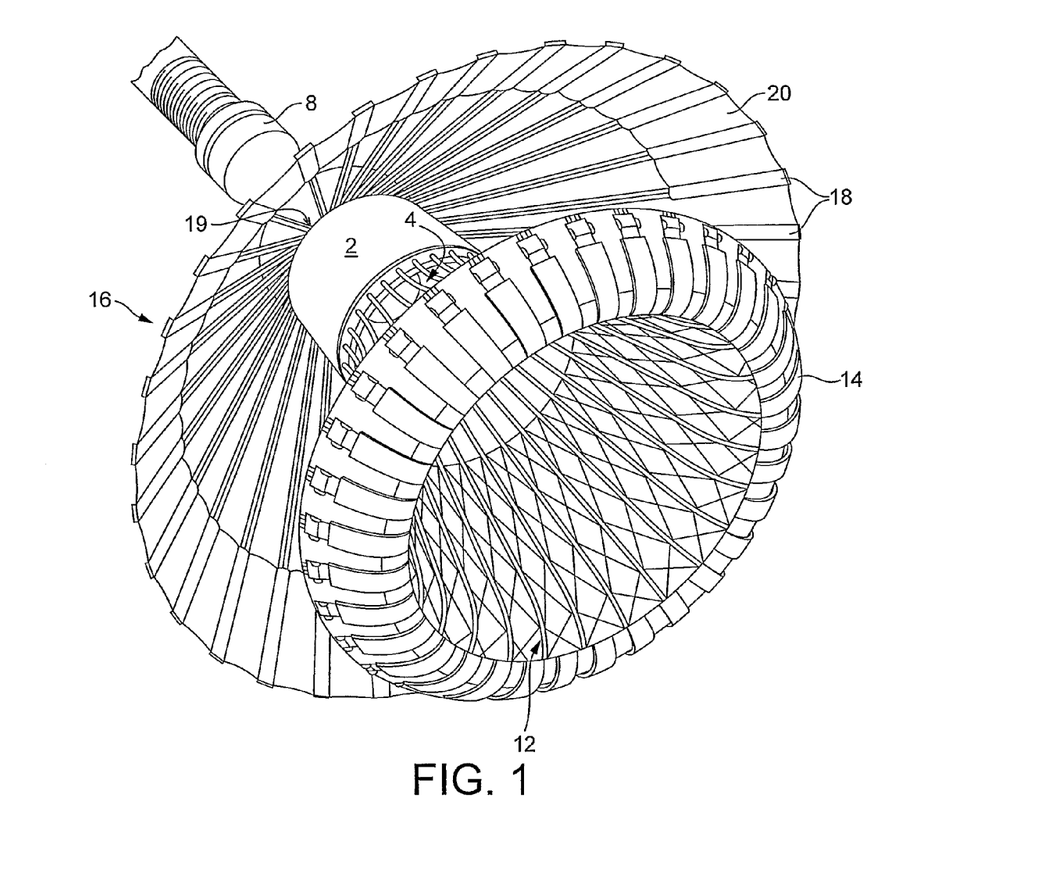
FIG. 1 is a perspective view from the behind of a drogue assembly according to the invention.
Figure 2:
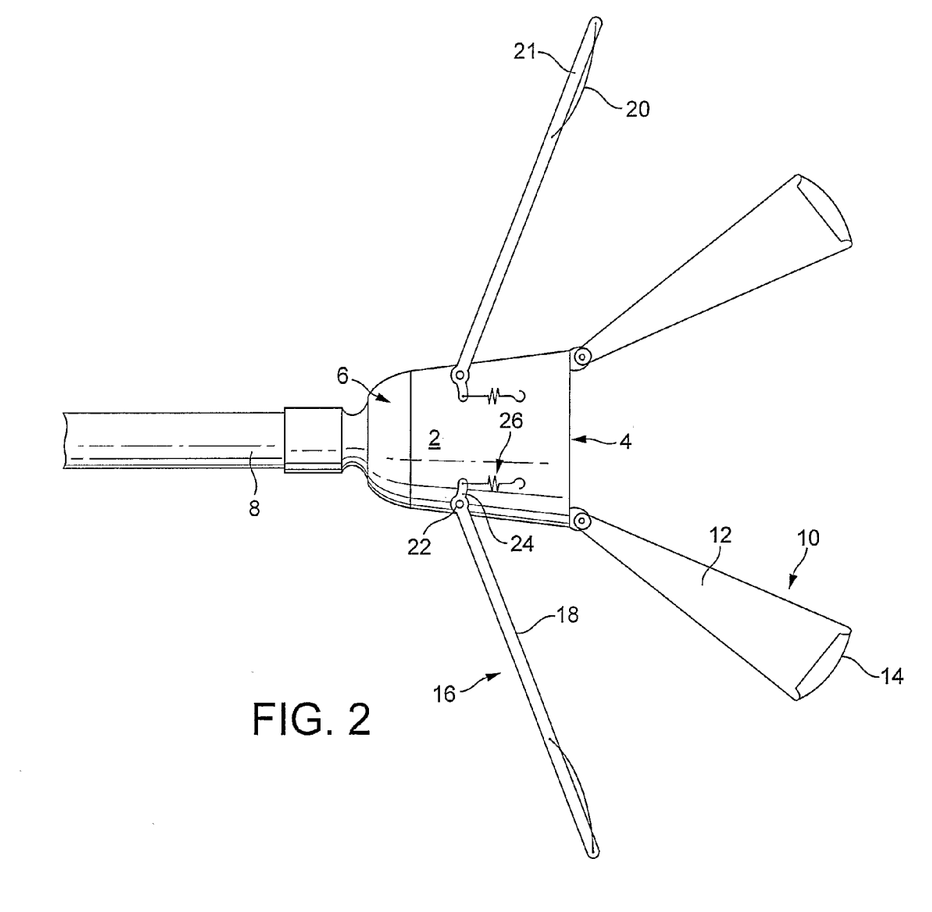
FIG. 2 is a schematic side cross-sectional view of the drogue assembly of FIG. 1 with the second canopy parachute in a deployed condition.

Referring to FIGS. 1 and 2, the drogue assembly includes a reception coupling unit 2 which is substantially cylindrical in form and which is arranged to receive a refueling probe of a following aircraft at an open end 4 thereof. At the opposite or upstream end 6 a hose 8 for carrying the fuel and delivering it to the probe is connected to the coupling unit 2. A fixed drogue parachute 10 of a known type is arranged around the periphery of the opening 4 in the coupling unit 2 in a known manner. The known drogue parachute assembly in this example comprises a plurality of circumferentially arranged support arms 12 having a triangular shape, and carrying a first canopy 14 between the short sides at the tips of the support arms 12. The canopy 14 may present a fixed effective area to the airflow to provide drag in flight, or it may be mounted on leaf springs so as to provide a variable area, as is known in the art.

The drogue assembly further includes a foldable parachute 16. The foldable parachute 16 also comprises a circumferential array of support arms 18 which carry a second canopy 20. The second canopy 20 comprises an annular strip of sheet material connected to the tip portion 21 of each support arm 18 at circumferentially spaced intervals. The support arms 18 are mounted to the reception coupling 2 upstream of the fixed drogue parachute 10, so as to be arranged around the fixed parachute 10, and axially spaced therefrom. Each of the support arms 18 extends through an aperture 19 in the coupling unit 2. In the deployed condition as shown in FIG. 2, the second canopy 20 presents a certain effective area to the air flow in flight to provide additional drag for the coupling unit 2.

Figure 3:
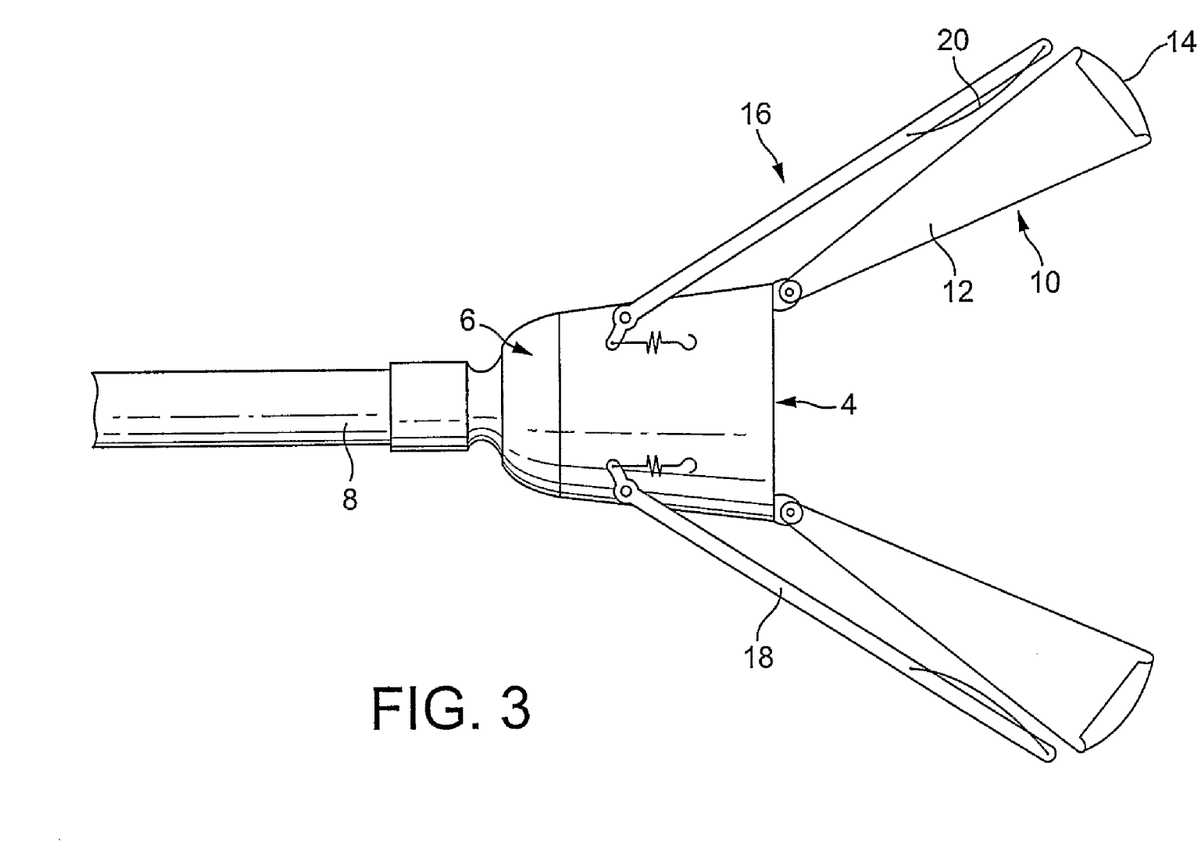
FIG. 3 is schematic cross-sectional side view of the drogue assembly of FIG. 2 with the second canopy parachute in the folded condition.

As also shown in FIGS. 2 and 3, each support arm 18 is pivotably mounted within the coupling unit 2 at a pivotal mount 22 adjacent the base of the arm 18. The base of each support arm 18 comprises a short leg 24 extending beyond the pivotable mount 22, at the end of which is connected one end of a spring 26. The opposite end of the spring 26 is attached to the coupling unit at a position axially spaced in a downstream direction from the pivotable mount 22. Thus the biasing effect of each spring 26 tends to pull the end of the leg 24 axially downstream with respect to the coupling unit 2, so as to tend to cause the support arm 18 to rock around the mount 22 such that the tip 21 moves in an upstream direction. Thus the arms 18 flare outwardly from the coupling 2, and the second canopy 20 presents a relatively large effective area to the airflow.

In use of the drogue assembly at low speeds, the foldable parachute will maintain the deployed position described above, as the air load on the second canopy 20 will be insufficient to cause the arms 18 to move against the bias of the springs 26. However, as the speed of flight, and thus of movement of the coupling unit 2 increases, for example above around 130 KEAS, the air pressure loading on the second canopy 20 tends to push the tips 21 of support arms 18 in a downstream direction. Thus the arms 18 rock around the pivot mounts 22 against the bias of the springs 26, extending the springs and folding the parachute 16 inwardly towards the fixed drogue parachute 10. With the springs 26 extended, as seen in FIG. 3, and the foldable drogue parachute 16 folded inwardly, the second canopy 20 makes a shallower angle to the unit 2, presenting a smaller effective area to the air flow, and reducing the drag.

Furthermore, in the folded condition, the overall diameter of the drogue is reduced. Therefore at high air speeds, the drogue assembly has an envelope similar to the envelope of a known drogue parachute alone. A high speed aircraft which has been designed for coupling with a standard drogue may have a structural exclusion area sized for a standard fixed drogue assembly. Since at such speeds the foldable drogue assembly of this invention is in a folded condition, the exclusion area should be sufficient to accommodate the assembly of the invention.

Figures 4, 5:
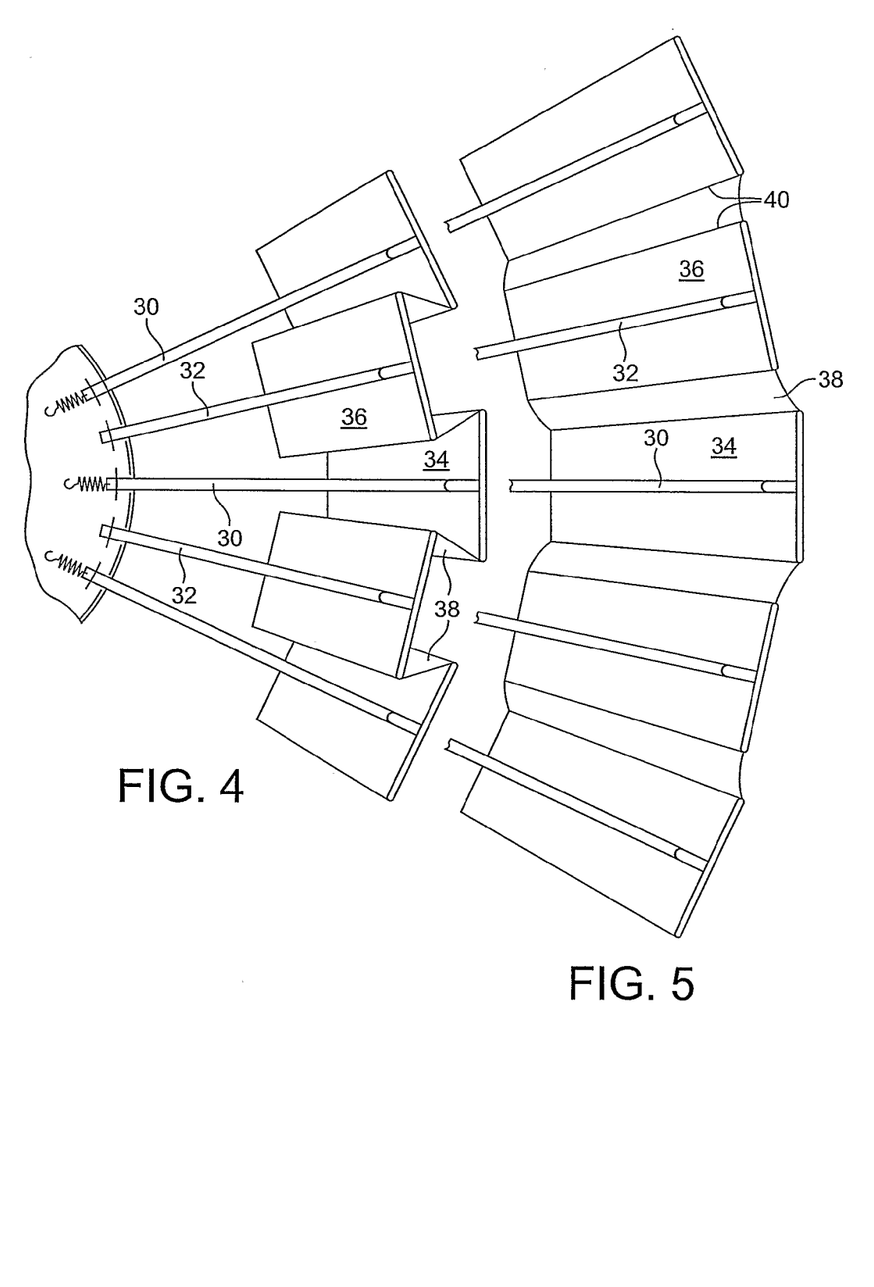
FIG. 4 shows schematic partial front view of a second drogue according to another embodiment of the invention, in the folded conditions.
FIG. 5 shows the canopy section of the drogue of FIG. 4 in the unfolded condition.

Referring now to FIGS. 4 and 5, the foldable drogue may be arranged such that only alternate support arms 30 are biased outwardly, with the remainder 32 being simply pivotally mounted. The second canopy has alternating radially extending stiffened sections 34, 36 and flexible sections 38. The stiffened sections 34, 36 are attached to each support arm 30, 32, with the flexible sections 38 between the arms 30, 32. In this arrangement, the boundary 40 between each adjacent section forms a fold line when the canopy is folded.

Thus the canopy tends to adopt a shape in which the biased arms 30 flare further outwardly than the unbiased arms 32. Therefore, when the canopy folds against the bias, the unbiased arms 32 lead, such that the stiffened sections 36 attached thereto overlap the remaining stiffened sections 34, with the flexible sections 38 stretched in between. This arrangement avoids the canopy fabric being loose in the folded condition of the drogue, and therefore prevents the fabric from flapping which could potentially damage the canopy.

Figure 6:
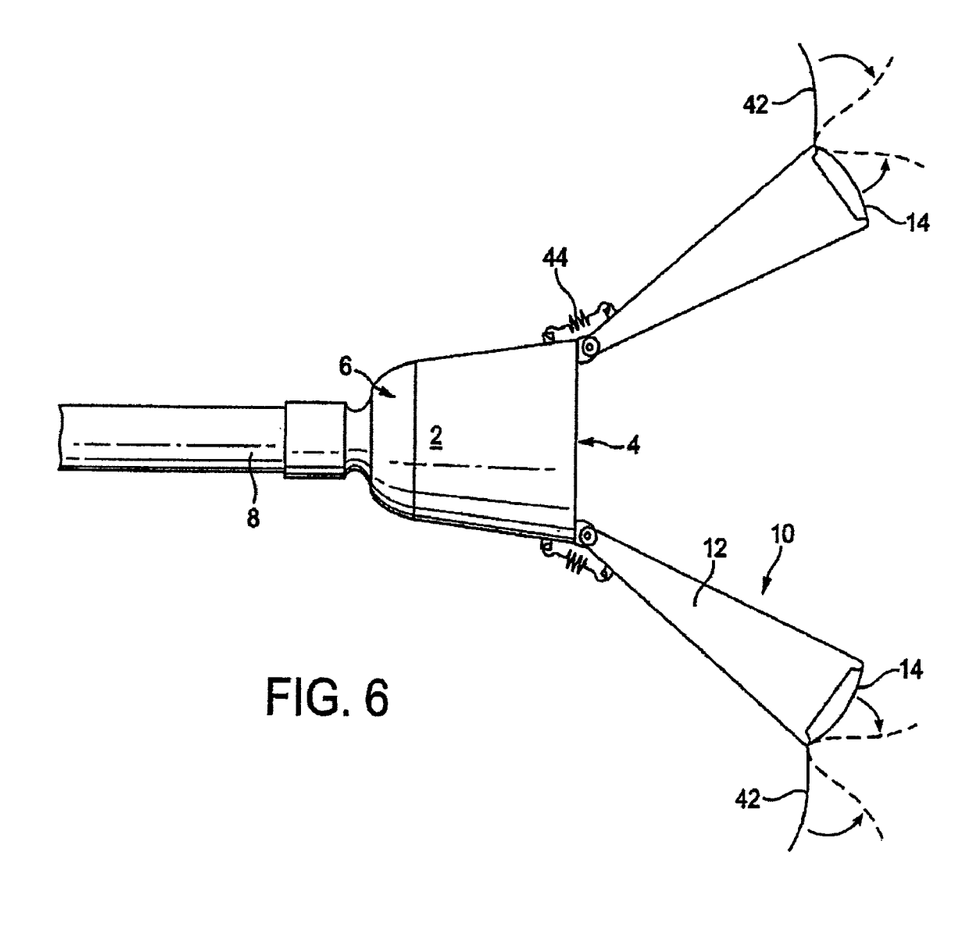
FIG. 6 is a schematic side view of a drogue assembly according to another embodiment of the invention.

FIG. 6 shows an alternative embodiment of the invention, in which the second canopy 42 is mounted on the same set of support arms 12 as the first canopy 14. The canopy 42 comprises an annular strip of sheet material similar to that of the first canopy 14, but it extends outwardly from the support arms so as to surround the first canopy 14. The second canopy 42 is mounted so as to be able to flex towards the direction of the air flow into the position showing in broken lines, such that it is folded in towards the first canopy. For example it may be mounted on a set of leaf springs inserted into pockets of the canopy in the conventional manner. With this arrangement, the second canopy 42 exerts a load on the support arms 12 tending to push them inwardly in the presence of an air flow. Therefore the support arms are biased outwardly by means of an array of springs 44 connected between the coupling unit 2 and at least some of the support arms 12, at a position near the base thereof.

In use, at low airspeeds (for example below 100 keas) the first and second canopies 14, 42 are in the positions shown in solid lines in FIG. 6. In this position the canopies present a high effective area to the air flow. As the airspeed increases, the first and second canopies 14, 42 move towards the positions shown in broken lines. The canopies may reach these positions for example at airspeeds of approximately 200 keas. It can be seen that each canopy presents a smaller effective area to the air flow in these positions, thus automatically providing a substantially constant drag load on the drogue. Also, in the folded position, the second canopy is closed towards the envelope of the first canopy.

The invention claimed is:

1. A drogue assembly for in-flight refueling comprising:
   a reception coupling member having a longitudinal axis and an aperture for receiving a refueling probe along the longitudinal axis, and
   at least one drogue parachute arranged around the coupling member, the at least one parachute comprising at least one circumferential array of support arms, the support arms carrying a first canopy and a second canopy circumferentially arranged about the longitudinal axis, the second canopy being arranged around the first canopy, the second canopy having a configuration which is arranged to change under increasing air pressure loading on the second canopy in flight such that the second canopy folds radially inwardly towards the first canopy and the longitudinal axis, and the effective area of the second canopy is thereby reduced.

2. A drogue assembly as claimed in claim 1, wherein the at least one circumferential array of support arms includes a first array of support arms and a second array of support arms, the first canopy is mounted on the first array of support arms, and the second canopy is mounted on the second array of support arms positioned upstream of the first canopy.

3. A drogue assembly as claimed in claim 2, wherein the second array of support arms is foldable towards the first array under air pressure loading in flight.

4. A drogue assembly as claimed in claim 1, wherein the first canopy is suitable for use at airspeeds in excess of 180 KEAS.

5. A drogue assembly as claimed in claim 1, wherein the canopies each comprise sheet material mounted adjacent tips of the support arms, and extending therebetween.

6. A drogue assembly as claimed in claim 5, wherein an annular strip of the sheet material is mounted to the support arms at circumferentially spaced intervals.

7. A drogue assembly as claimed in claim 1, further comprising a biasing means acting between a base of at least some of the support arms and the coupling member to bias the support arms outwardly.

8. A drogue assembly as claimed in claim 7, wherein the biasing means comprises a spring associated with each respective support arm.

9. A drogue assembly as claimed in claim 1, wherein the support arms are each pivotally mounted to the coupling member at a pivot position adjacent a base of the respective support arm, so as to be rockable around the pivot position.

10. The drogue assembly of claim 1, wherein the at least one circumferential array of support arms includes a first array of support arms and a second array of support arms, and the at least one parachute includes a first parachute including the first array of support arms carrying the first canopy and a second parachute including the second array of support arms carrying the second canopy.

11. The drogue assembly of claim 10, wherein the second parachute is foldable towards the first parachute.

12. The drogue assembly of claim 1, wherein:
the configuration of the second canopy is adjustable independently of a state of the first canopy; and
the first canopy and the second canopy are mounted on the same array of support arms.

13. The drogue assembly of claim 12, wherein the second canopy is mounted so as to be able to flex towards the first canopy and towards the direction of air flow.

14. The drogue assembly of claim 1, wherein the second canopy comprises radially alternating stiffened sections and flexible sections.

15. A drogue assembly for in-flight refueling comprising:
a reception coupling member having a longitudinal axis and an aperture for receiving a refueling probe along the longitudinal axis
at least one circumferential array of support arms mounted to and arranged around the coupling member, the at least one array of support arms carrying a first canopy and a second canopy circumferentially arranged about the longitudinal axis, the second canopy being arranged around the first canopy, the second canopy being configured to fold radially inwardly towards the first canopy and the longitudinal axis in flight and under increasing air pressure loading on the second canopy; and
a biasing member connecting at least some of the support arms to the coupling member, the biasing member being configured to bias the support arms outwardly.

16. The drogue assembly of claim 15, wherein the biasing member comprises a spring associated with each respective support arm.

17. A method for assembling a drogue assembly for in-flight refueling, the drogue assembly including a reception coupling member having a longitudinal axis and an aperture for receiving a refueling probe along the longitudinal axis, the method comprising:
mounting at least one drogue parachute on and around the coupling member, the at least one parachute comprising at least one circumferential array of support arms, the support arms carrying a first canopy and a second canopy circumferentially arranged about the longitudinal axis; and
arranging the second canopy around the first canopy so that the second canopy is configured to fold radially inwardly towards the first canopy and the longitudinal axis in flight and under increasing air pressure loading on the second canopy.

18. The method of claim 17, further including biasing the support arms outwardly.

19. The method of claim 17, wherein the at least one circumferential array of support arms includes a first array of support arms and a second array of support arms, the first canopy is mounted on the first array of support arms, and the method further includes:
mounting the second canopy on the second array of support arms positioned upstream of the first canopy.

20. The method of claim 17, further including mounting the first canopy and the second canopy on the same array of support arms, wherein the second canopy is arranged around the first canopy so that the second canopy is configured to be adjustable independently of a state of the first canopy.

21. The drogue assembly of claim 1, wherein the configuration of the second canopy is adjustable independently of a state of the first canopy.

22. The drogue assembly of claim 1, wherein, when the second canopy is in a maximum drag-producing configuration, the second canopy presents a cross-section to an airflow which is at least partly outside a cross-section presented to the airflow by the first canopy, and the first canopy presents a cross-section to the airflow which is at least partly outside the cross-section presented to the airflow by the second canopy.

23. The drogue assembly of claim 15, wherein the second canopy has a configuration that is adjustable independently of a state of the first canopy.

24. The drogue assembly of claim 15, wherein the second canopy is configured such that when the second canopy is in a maximum drag-producing configuration, the second canopy presents a cross-section to an airflow which is at least partly outside a cross-section presented to the airflow by the first canopy, and the first canopy presents a cross-section to the airflow which is at least partly outside the cross-section presented to the airflow by the second canopy.

25. The method of claim 17, wherein the second canopy is arranged around the first canopy so that the second canopy is configured to be adjustable independently of a state of the first canopy.

26. A drogue assembly for in-flight refueling comprising:
a reception coupling member having a longitudinal axis and an aperture for receiving a refueling probe along the longitudinal axis, and
at least one drogue parachute arranged around the coupling member, the at least one parachute comprising at least one circumferential array of support arms, the support arms carrying a first canopy and a second canopy circumferentially arranged about the longitudinal axis, the second canopy being arranged radially outside the first canopy so as to present a cross-section to an airflow when in a drag-producing configuration, the second canopy being pivotally mounted on the support arms at an end of the support arms distal from the coupling member and having a configuration which is arranged to be continuously variable under air pressure loading on the second canopy in flight such that as air pressure loading increases the second canopy pivots so as to move radially inwardly towards the first canopy and the longitudinal axis, and the cross-section of the second canopy presented to the airflow is thereby reduced; and a biasing arrangement acting between a base of at least some of the support arms and the coupling member to bias the support arms outwardly.

* * * * *